United States Patent [19]

Hickerson

[11] 4,219,967
[45] Sep. 2, 1980

[54] FLOWER POT WATERING APPARATUS

[76] Inventor: Norman E. Hickerson, Box 1148, Apopka, Fla. 32703

[21] Appl. No.: 932,531

[22] Filed: Aug. 10, 1978

[51] Int. Cl.³ .............................................. A01G 9/02
[52] U.S. Cl. ........................................... 47/72; 47/81
[58] Field of Search .................. 47/14, 15, 66, 70, 71, 47/72, 79, 80, 81

[56] References Cited

U.S. PATENT DOCUMENTS

| | | | |
|---|---|---|---|
| 616,968 | 1/1899 | Price | 47/79 |
| 1,342,786 | 6/1920 | White | 47/81 |
| 2,344,794 | 3/1944 | Vallinos | 47/80 |
| 2,486,932 | 11/1949 | Elliott | 47/71 |
| 2,813,063 | 11/1957 | Bjorksten | 47/81 |
| 3,298,133 | 1/1967 | Courtright | 47/81 |
| 3,754,352 | 8/1973 | Bates | 47/80 |
| 4,047,329 | 9/1977 | Holt | 47/71 |

FOREIGN PATENT DOCUMENTS

| | | | |
|---|---|---|---|
| 2628392 | 12/1977 | Fed. Rep. of Germany | 47/81 |
| 579120 | 10/1924 | France | 47/81 |
| 2255843 | 7/1975 | France | 47/81 |

Primary Examiner—Edgar S. Burr
Assistant Examiner—James R. Feyrer
Attorney, Agent, or Firm—Duckworth, Hobby, Allen & Pettis

[57] ABSTRACT

An apparatus for supporting a flower pot and watering the contents thereof. The watering system uses a separate base having a liquid reservoir therein for holding water or water and plant nutrients. A separate flower pot container has a bottom portion shaped to fit over the liquid reservoir and onto the base, and is shaped to receive a flower pot therein. The inside bottom portion of the container is shaped to receive a fiber-pad mounted therein, and has an opening for the fiber-pad to pass through into the reservoir. The liquid in the reservoir maintains the fiber-pad damp, which is absorbed through openings in the base of the flower pot. A filling spout and float level are provided in the base.

1 Claim, 5 Drawing Figures

FLOWER POT WATERING APPARATUS

BACKGROUND OF THE INVENTION

The present invention relates to self-watering flower pots and especially to a flower pot watering device for supporting a conventional flower pot for watering and feeding a plant growing therein.

In the past, a variety of self-watering flower pots have been provided for providing liquid or liquid nutrients to the plant in the pot. Typical prior art flower pots can be seen in U.S. Pat. Nos. 135,271; 1,712,986; and 1,879,784, each of which shows various types of flower pots which are watered in different manners. In U.S. Pat. No. 918,563, a combination flower pot having a watering reservoir is shown and U.S. Pat. No. 2,993,300 is a seed growth display apparatus. U.S. Pat. No. 3,022,605 has a method of packing seedling plants for shipment and U.S. Pat. 3,290,819 has a floral mounting member. German Pat. No. 1,003,489, dated Feb. 28, 1957, shows a pot holding device, and Swiss Pat. No. 264,833, dated Feb. 1, 1950, illustrates a water container. In Polish Pat. No. 45098, dated 1960, a self-watering pot is shown, and French Pat. No. 1,414,605 has a plant growing system.

The typical prior art shows self-watering pots working on a variety of principals, one of the most common being a separate water container surrounding the water pot and separated by a wall, and allowed the entry of water to the flower pot through gravity, or through a wick. Another type of watering pot simply uses a wick extending up into the soil in the flower pot and into a reservoir located below the flower pot so that the liquid can be absorbed through the wick into the soil. For instance, in U.S. Pat. No. 1,216,642, waterfilled base supports a conventional flower pot having a wick rising from the base and inserted through a hole in the bottom of the flower pot up into the soil, and in U.S. Pat. No. 3,058,263, a flower pot is inserted into an outer shell, which communicates with a housing having a water absorbent material therein.

The present invention, on the other hand, uses a simplified combination in which a container has a fiber-pad covering the entire bottom portion and extending for its width into a separate reservoir so that a typical flower pot having a plant therein may be purchased from a store and placed in the decorative container, thereby hiding the utilitarian flower pot in a more decorative container, and providing self-watering and feeding from the reservoir to the base pad which is absorbed directly through the openings in the bottom of the flower pot. The plant can be easily removed, and another plant quickly placed therein without removing the flower and soil from the flower pot as purchased.

SUMMARY OF THE INVENTION

A flower pot watering device has a base with a liquid reservoir therein for holding a supply of liquid and a decorative flower pot container removably mounted thereover and shaped to receive a flower pot therein. The bottom portion of the flower pot container is shaped to hold a fiber-pad and an opening through the bottom allows the pad to extend down into the reservoir, so that the entire bottom of the flower pot container can be maintained moist for absorption into openings in the bottom of the conventional flower pot. A float level is provided in the base, as is a filling spout for filling the base without removing the flower pot.

BRIEF DESCRIPTION OF THE DRAWINGS

Other objects, features and advantages of the present invention will be apparent from the written description and the drawings, in which.

DESCRIPTION OF THE PREFERRED EMBODIMENT

Figure 1:
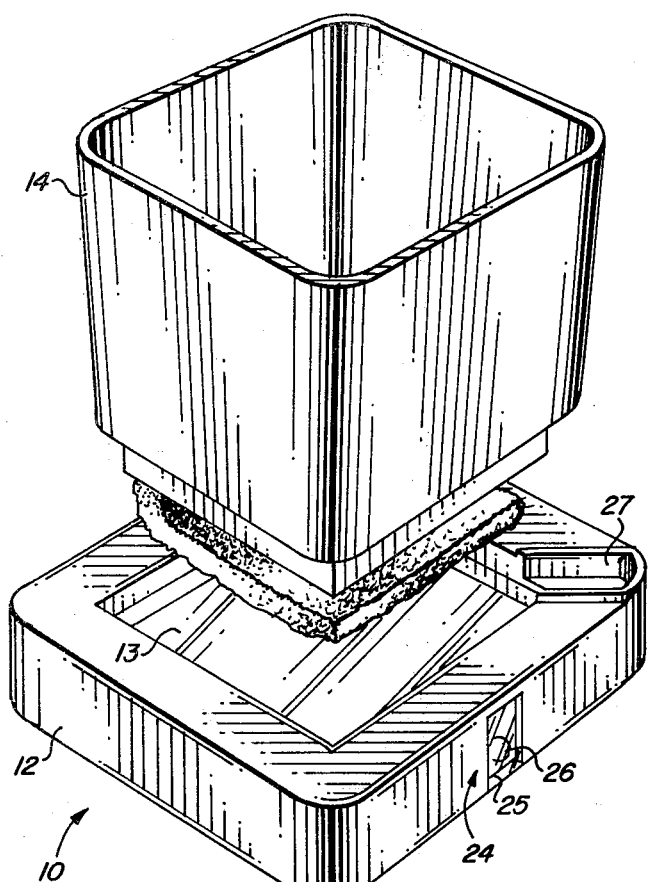
FIG. 1 is an exploded perspective view of a flower pot watering device in accordance with the present invention.
Figure 3:
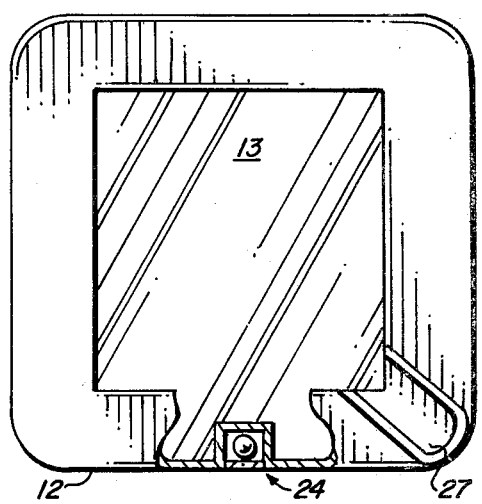
FIG. 3 is a cutaway elevation of the base of the flower pot of FIGS. 1 and 2.
Figure 4:
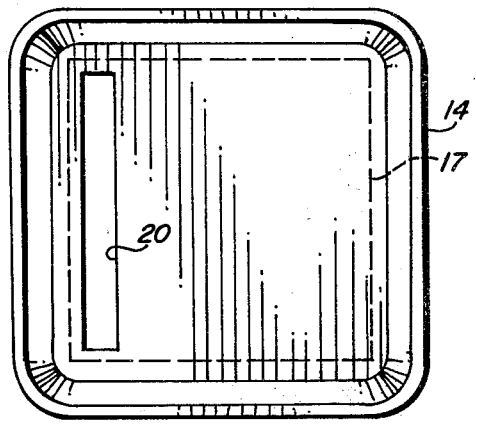
FIG. 4 is a top elevation of a flower pot watering device in accordance with FIGS. 1 through 3.
Figure 2:
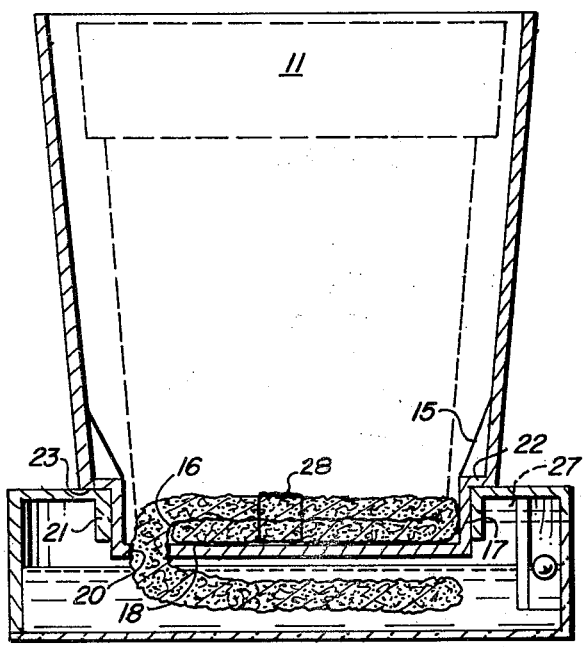
FIG. 2 is a sectional view of the watering device of FIG. 1 having a flower pot shown therein in dashed lines.
Figure 5:
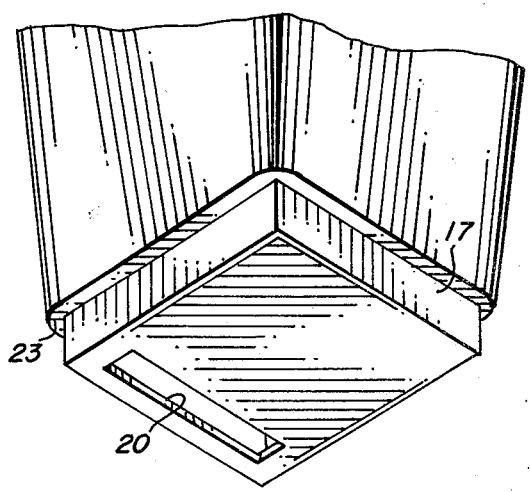
FIG. 5 is a fragmentary perspective of the bottom portion of the flower pot container.

Referring to all of the drawings, a flower pot watering device 10 is illustrated for inserting a conventional flower pot 11 shown in dashed lines in FIG. 2. The flower pot watering device 10 includes a base 12 having a liquid reservoir 13 formed therein and a flower pot container 14 for mounting on top of the base 12. The flower pot container 14 may have a decorative exterior and is sized for inserting a flower pot 11 thereinto, and may have flower pot guides 15 for guiding the flower pot 11 into the center portion of the container 14 and onto a fiber-pad 16. The flower pot container 14 has a shaped, square bottom portion 17 shaped for the pad 16 which may be folded and covers the entire bottom 18 of the bottom portion 17 and extends through an elongated pad opening 20 into the reservoir 13. The pad 16 may be stapled by staple 28 or glued with a waterproof adhesive to hold it in a folded position. The bottom portion 17 is shaped to exactly fit into an opening in the base 12 above the reservoir 13 having internal flanges 21 matching the base wall 17 so that a ledge 22 extending around the flower pot container 14 will sit on the top 23 of the base 12. Thus, the flower pot container 14 is supported by the top 23 of the base 12 and is supported horizontally by the flanges 21 coupled to the square bottom portion 17 of the base. The base 12 has a float guage 24 having a transparent window 25 and a floating sphere 26 to readily tell the amount of liquid contained in the reservoir 13. In addition, a reservoir filling spout 27 is provided on one corner of the base 12 to allow liquid to be poured into the reservoir 13 without removing the flower pot container 14.

Advantageously, the present invention allows a conventional flower pot as purchased in a store to be inserted into the flower pot container 14 without repotting the plant, and provides a self-watering container for the potted plant while hiding the conventional flower pot that the plant is bought in. The flower pots, of course, have to have openings in the bottom, as most do, and must be sized to fit into the flower pot container 14 and onto the fiber-pad 16. Liquid is absorbed in the reservoir by the fiber-pad 16 and is maintained in the bottom portion 17 in a damp condition where the moisture and nutrients can be absorbed through the base of the flower pot 11 into the soil therein to maintain the plant in the flower pot without continuous supervision.

In actual practice, it has been found that the present flower pot watering device will maintain imporved watering and growth characteristics of the typical foliage plant that might be inserted therein. The water placed in the reservoir can, of course, have soluble nutrients placed therein for controlled feeding of a potted plant supported in the flower pot container. Staple 28 in FIG. 2 holds pad 16 in a folded position.

It should be clear to one of ordinary skill that a watering device for conventional flowerpots having soil and plants therein has been provided. The base and flower pot container can be made of polymer materials, if desired, which can be injection molded, while the float gauge sphere 26 can be made of any floating material, such as foamed polymer, which can be painted a bright color. The fiber-pad can be made of dacron polyester fiber, but it will of course be clear that other materials can be provided without departing from the spirit and scope of the invention. Accordingly, the present invention is not to be construed as limited to the particular forms disclosed herein, which are to be regarded as illustrative rather than restrictive.

I claim:

1. A flower pot watering apparatus comprising in combination:
   a base having a float gauge formed therein, said float gauge having a transparent window and a floating sphere mounted behind said window to float with the level of liquid in said liquid reservoir;
   a liquid reservoir in said base for holding a supply of liquid therein;
   a flower pot container having a bottom portion shaped to fit over said liquid reservoir onto said base, said container being shaped to receive a flower pot therein and having the inside portion of said bottom portion formed to receive a fiber-pad, said bottom portion having an opening therethrough, and said flower pot container having a decorative shape to at least partially conceal a conventional flower pot therein;
   a fiber-pad covering said bottom portion of said container and extending through said opening therein and into said liquid reservoir when said container is mounted thereover onto said base, said fiber-pad being folded a plurality of folds and stapled to hold said folded fiber-pad in a folded position, whereby a plant mounted in a conventional flower pot can be maintained by a separate flower pot watering apparatus;
   guide members formed in said flower pot container for positioning a flower pot bottom portion onto said fiber-pad; and
   said flower pot container bottom portion being formed to a predetermined shape for fitting into a predetermined opening in said base including said base having a top portion having an opening therein with internally protruding flanges, and said flower pot container having a bottom portion forming a ledge for fitting on the top of said base and being supported adjacent said internal flanges of said base.

* * * * *